United States Patent [19]
Ogawa et al.

[11] Patent Number: 5,814,258
[45] Date of Patent: Sep. 29, 1998

[54] METHOD FOR FORMING MULTILAYER SHEET OR MULTILAYER FILM

[75] Inventors: Shotaro Ogawa; Kazuo Ozaki, both of Fujinomiya, Japan

[73] Assignee: Fuji Photo Film Co., Ltd., Kanagawa, Japan

[21] Appl. No.: 772,774

[22] Filed: Dec. 24, 1996

[30] Foreign Application Priority Data

Dec. 28, 1995 [JP] Japan .................................. 7-342609
Jan. 24, 1996 [JP] Japan .................................. 8-010335

[51] Int. Cl.$^6$ .................................................. B29C 47/06
[52] U.S. Cl. .................................. 264/173.12; 264/173.14
[58] Field of Search ........................... 264/173.12, 173.14

[56] References Cited

U.S. PATENT DOCUMENTS

| | | |
|---|---|---|
| 3,480,998 | 12/1969 | Erdberg . |
| 4,592,885 | 6/1986 | Ichino et al. ........................ 264/173.16 |
| 4,695,236 | 9/1987 | Predohl et al. ........................ 425/131.1 |
| 5,147,195 | 9/1992 | Cloeren .................................. 425/133.5 |
| 5,389,324 | 2/1995 | Lewis et al. ........................ 264/173.12 |

FOREIGN PATENT DOCUMENTS

| | | |
|---|---|---|
| 435 786 | 7/1991 | European Pat. Off. . |
| 52-60853 | 5/1977 | Japan . |
| 54-107664 | 7/1979 | Japan . |
| 60-37781 | 8/1985 | Japan . |
| 62-149411 | 7/1987 | Japan . |
| 62-43846 | 9/1987 | Japan . |
| 7-15321 | 3/1995 | Japan . |

OTHER PUBLICATIONS

Patent Abstracts of Japan vol. 003, No. 118 (C–060), Oct. 4, 1979; & JP 54 097663 A (Mitsubishi Heavy Ind Ltd), Aug. 1, 1979 *Abstract.

Wirtz R: "Werkzeuge Zur Extrusion Von Tafeln Und Flachfolien" Kunststoffberater, vol. 40 No. 10, Oct. 1, 1995; Heidelberg, DE pp. 27–33 XP000548360.

*Primary Examiner*—Leo B. Tentoni
*Attorney, Agent, or Firm*—Sughrue, Mion, Zinn, Macpeak & Seas, PLLC

[57] ABSTRACT

An improved method for forming a multilayer sheet or multilayer film and an improved forming die apparatus, include making the thickness of the multilayer sheet or multilayer film uniform along the width. In the forming die apparatus, an elastic choke bar is disposed in a passage of the melted resin along the width of the passage. A plurality of bolt members are arranged to abut against the choke bar. The choke bar is pushed and pulled by each bolt member, and a part of the choke bar corresponding to the bolt member is bent with regard to the passage. Thereby, the clearance along the width of the passage can be adjusted for every bolt member.

4 Claims, 8 Drawing Sheets

POSITIONS IN THE DIRECTION OF DIE WIDTH
(POSITIONS IN THE DIRECTION OF PASSAGE WIDTH)

FIG. 11

POSITIONS IN THE DIRECTION OF DIE WIDTH
(POSITIONS IN THE DIRECTION OF PASSAGE WIDTH)

METHOD FOR FORMING MULTILAYER SHEET OR MULTILAYER FILM

BACKGROUND OF THE INVENTION

1. Field of the Invention

The present invention relates to a method for forming a multilayer sheet or multilayer film, and a forming die apparatus, and more particularly to a method for forming a multilayer sheet or multilayer film, and a forming a die apparatus which makes the thickness uniform along the sheet width of each layer composing the multilayer sheet or the multilayer film.

2. Description of the Related Art

When a multilayer sheet or multilayer film (hereinafter described in an example of the multilayer sheet) is formed by a die apparatus which is generally called a "multi-manifolds die," provided with a plurality of manifolds, it is critical to make the thickness uniform along the sheet width during extruding each layer of melted resin so as to manufacture the high-quality multilayer sheet having a large yield.

Thus, a number of methods and apparatuses have been developed for making the thickness uniform along the sheet width during extruding each layer of melted resin.

Regarding the conventional methods for forming the multilayer sheet or the multilayer film, Japanese Patent Provisional Publication No. 62-149411 for example, discloses a method of manufacturing a co-extrusion sheet. It discloses forming the multilayer sheet in a feed block method. In this method, when the layers of melted resin composing the multilayer sheet are joined before the forming die apparatus, the ratio of the melt viscosity between the adjacent resins is more than 2.

U.S. Pat. No. 4,592,885 which corresponds to Japanese Patent Publication No. 62-43846 discloses a method of manufacturing film without melt fracturing in which a flow of a polymer solution having a high viscosity (3000–10000 poise) is extruded, being covered by a flow of solution having a low viscosity (1–3000 poise).

As an example of the conventional forming die apparatus for forming the multilayer sheet or the multilayer film, Japanese Utility Model Provisional Publication No. 54-107664 discloses a multilayer sheet forming die, which adjusts the clearance in the entire passage from the manifold to the confluence by means of a choke bar mechanism. Japanese Patent Provisional Publication No. 52-60853 discloses a method of manufacturing film, in which a confluent angle formed by resin passages at the confluence is adjusted by at least one choke bar facing the confluence. Japanese Utility Model Provisional Publication No. 7-15321 discloses a multilayer sheet forming apparatus providing a passage sectional area adjusting means, which forms a thin plate and pushes and pulls the thin plate along the thickness of the thin plate at the non-passage side of the thin plate, at a part in at least one of plural passages from the manifolds to the confluence. Japanese Patent Publication No. 60-37781 discloses an extrusion sheet forming die providing a straight manifold, a passage whose length gradually increases and a slot whose length gradually decreases from the center of the die to both ends thereof following the manifold.

In the method of forming the extrusion sheet in the Japanese Patent Provisional Publication No. 62-149411, however, the thickness along the sheet width of the multilayer sheet is not always uniform. The expansion of each layer in the multilayer along the sheet width is controlled by a difference in their viscosities. Thus, the kinds of the resin contained in the edges (both ends of the sheet along its width) of the multilayer sheet are reduced so that the edges can be reused.

The film manufacturing method disclosed in U.S. Pat. No. 4,592,885 has a disadvantage in that if there is a great difference between the flows of melted resin, that is, if the multilayer film is composed of extremely thin and thick layers, it is extremely difficult to adjust the thickness along the width of the thin layer.

Furthermore, the conventional forming die apparatus is faced with a disadvantage in that the thickness unevenness occurring along the width of the passage (the width of the passage is the width of the sheet) in each layer composing the multilayer sheet cannot be prevented, although the thickness of the whole multilayer sheet can be adjusted. In particular, if there is a great difference of viscosity among the plural resins, and if there is a great difference of the extruded flow rate among the plural resins (i.e. there is a great difference in the thickness among the layers), it is extremely difficult to extrude the melted resin from the die apparatus while keeping the thickness of each layer uniform along the sheet width. Even if the die apparatus is designed to be suitable for a desired extrusion, one die apparatus cannot cope with the change in the extrusion conditions (e.g. resin flow rate, resin temperature, and resin character).

Incidentally, the film forming described here includes the film forming by an extrusion lamination.

SUMMARY OF THE INVENTION

The present invention has been developed in view of the above-described circumstances, and has as its object the provision of a method for forming a multilayer sheet or multilayer film, in which the thickness of each layer, an extremely thin layer in particular, can be made uniform even if there is a great difference in the resin flow rate among the layers when the forming die apparatus forms the multilayer sheet or film.

It is another object of the present invention to provide a forming die apparatus for forming the multilayer sheet or film, which apparatus is able to cope easily and effectively with the change in the extrusion conditions such as the resin flow rate, the resin temperature, and the resin character and make the thickness of each layer uniform along its width, so that the high-quality multilayer sheet or the multilayer film having a large yield can be manufactured.

In order to achieve the above-mentioned objects, the present invention is directed to the method for forming the multilayer sheet or the multilayer film, which comprises the steps of: joining the melted resins supplied to plural manifolds at a confluence via passages for the resins, piling the melted resins in plural layers at the confluence, and extruding the resins from the slit to the outside so as to form the multilayer sheet or the multilayer film, and which method is characterized in that if the flow rate of a resin forming a layer of layers composing the multilayer sheet or the multilayer film is equal to or less than $\frac{1}{25}$ of the total flow rate of resins forming the other layers, a ratio of melt viscosity of the resin forming the layer to melt viscosity of a resin forming a layer adjacent to the aforementioned layer is adjusted to be equal to or more than 1.5 and equal to or less than 3 just before the confluence.

Furthermore, in order to achieve the above-mentioned objects, the present invention relates to a forming die apparatus for forming the multilayer sheet or the multilayer film, in which the melted resins supplied to the plural manifolds are joined at the confluence via the passages for the resins, the melted resins are piled in plural layers at the confluence and extruded from the slit to the outside, and the melted resins are expanded at the manifolds along the width of the passages to form the thin-film streams, and which is characterized in that a choke bar having elasticity is provided along the width of the passage, and a plurality of bolt members connect to the choke bar at certain intervals, and the bolt members are screwed so as to move the choke bar forward and backward with regard to the passage so that the clearance of the passage along the width of the passage can be adjusted.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

First, an explanation will be given about a method of forming a multilayer sheet or film.

Figure 1:
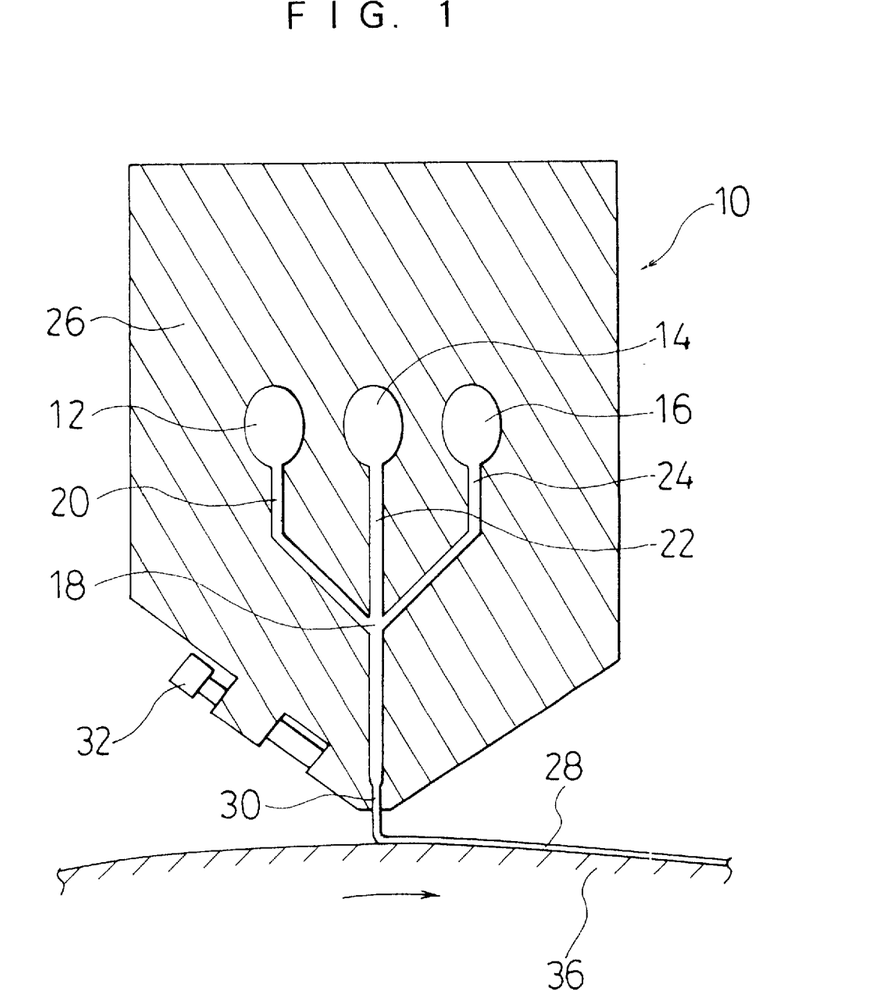
FIG. 1 is a side sectional view showing a forming die apparatus provided with a plurality of manifolds to which a method of forming a multilayer sheet or multilayer film according to the present invention is applied.

FIG. 1 is a side sectional view of a forming die apparatus 10, to which the method of forming the multilayer sheet or film according to the present invention is applied.

As shown in FIG. 1, the forming die apparatus 10 is composed mainly of: a forming die apparatus body 26 provided with manifolds 12, 14, and 16 each of which is supplied with melted resin by each of plural extruders, which extrude the melted resins which are different in viscosity, etc., a confluence 18 for piling the melted resins in plural layers, and plural passages 20, 22, and 24 for connecting the manifolds 12, 14, and 16 to the confluence 18; and a slit adjusting bolt 32 for adjusting the opening of a slit 30 which is equal to the thickness of the entire multilayer sheet 28 piled at the confluence 18. When the forming die apparatus 10 forms the multilayer sheet 28, the melted resins supplied to the manifolds 12, 14 and 16 are joined with each other via the passages 20, 22 and 24, respectively. The melted resins are piled in plural layers at the confluence 18 and are extruded from the slit 30 onto a rotating cooling drum 36. In this forming process, streams of melted resins are extended in the manifolds 12, 14 and 16 along the width of the passages 20, 22 and 24, so that the thin-film streams can be formed. The thickness of the entire multilayer sheet 28 is adjusted by adjusting the opening of the slit 30 with the slit adjusting bolt 32.

If there is a great difference in the resin flow rate when the forming die apparatus 10 forms the multilayer sheet or film, in other words, if the multilayer sheet or film is composed of extremely thin layers (hereinafter referred to as skin layers) and extremely thick layers (hereinafter referred to as core layers), it is very difficult to make the thickness uniform along the width of each layer, and in particular, the skin layer. Even if the forming die apparatus is designed to be suitable for a predetermined extrusion, one forming die apparatus cannot cope with the change in the extrusion conditions (e.g. resin flow rate, resin temperature, and resin character).

As a result of the researches, regarding the thickness of each layer along its width when there is a great difference in the resin flow rate under the condition that the ratio of the resin flow rate between the skin layer and the core layer is less than a predetermined value, the ratio of melt viscosity just before the confluence 18 between the skin layer and the core layer adjacent to the skin layer in the forming die apparatus 10 is adjusted in a predetermined range, so that the thickness along the width of each layer of each layer, and in particular, the skin layer can be uniform. That is, if the resin flow rate in the skin layer is equal to or less than 1/25 of the total resin flow rate in the core layer, the ratio of melt viscosity just before the confluence 18 is adjusted so that the melt viscosity of the resin forming the skin layer can be equal to or more than one and a half times and equal to or less than three times as high as the melt viscosity of the resin forming the core layer adjacent to the skin layer. In the present invention, if the multilayer sheet or the multilayer film is formed in three layers, the skin layer may be a top layer, a middle layer, or a bottom layer. If the skin layer is the middle layer, the skin layer of high viscosity is positioned between the core layers of low viscosity, so that the present invention can be achieved. If the skin layer is the top layer or the bottom layer, the core layer adjacent to the skin layer needs to satisfy the conditions with regard to the ratio of the melt viscosity.

Next, an explanation will be given about the method of forming the multilayer sheet or the multilayer film by means of the forming die apparatus 10, which is constructed in the above-mentioned manner, according to the present invention. In the following example, the multilayer sheet is formed in such a manner that the top layer is the skin layer, and the middle and bottom layers are the core layers. The resin flow rate in the skin layer is equal to or less than 1/25 of the total resin flow rate in the core layers.

First, each of the manifolds 12, 14, and 16 of the forming die apparatus 10 is supplied with the melted resin by each of extruders (not shown) which extrude the melted resins. During this supply, the resin flow rate of the melted resin for the skin layer, which is supplied to the manifold 16, is set at equal to or less than 1/25 of the total resin flow rate of the melted resins for the core layers, which are supplied to the manifolds 12 and 14.

Next, each melted resin supplied to each of the manifolds 12, 14, and 16 reaches the confluence 18 via each passage, and the melted resins are piled in plural layers at the confluence 18. Just before the confluence 18, the melt viscosity of the melted resin for the skin layer, which flows in the passage 24, is set at equal to or more than one and half times and equal to or less than three times as high as the melt viscosity of the melted resin for the core layer, which flows in the passage 22. In order to obtain the set ratio of the melt viscosity, the resins, which realize the ratio of the melt viscosity, may be selected from the material resins which are different in viscosity. In another way, heating or cooling means may be provided to heat or cool the manifolds 12, 14 and 16 or the passages 20, 22 and 24, so that the temperatures and viscosities of the melted resins just before the confluence 18 can be adjusted.

If the ratio of the melt viscosity is set at less than one and half times, the central portion of the skin layer along its width is thick, and both end portions are thin in many cases. That is, when a difference in the flow rate of the resins forming the layers is small, that is, when the thickness of the layers is almost the same, thickness unevenness hardly occurs even if the melt viscosity is the same. In order to stabilize an interface between the layers to prevent thickness unevenness, the melt viscosity of each layer is preferably the same. As the difference in the thickness of the layers increases, however, the pressure balance is lost in the direction of the die width of the forming die apparatus 10, which direction is the same as the direction of the width of the multilayer sheet 28. The pressure at both lateral ends is usually lower than the pressure at the center along the die width, and the thickness unevenness of the skin layer in particular is serious if the melt viscosity of the layers is the same. The tendency is obvious especially when the melt viscosity of the resin in the skin layer is small. As a result, the thickness of the skin layer is such that the central portion is thick and both lateral end portions are thin. On the other hand, if the ratio of the melt viscosity is set at more than 3, the interface between the layers, and in particular, the interface between the skin layer and the core layer is unstable at the confluence 18, and the thickness unevenness is serious.

Finally, melted resins piled in plural layers at the confluence 18 are extruded from the slit 30 onto the cooling drum 36. In this case, the opening of the slit 30 should be set in such a manner that the thickness of the entire multilayer is uniform along the sheet as possible.

Thus, the thickness of the layers, and in particular, the thickness of the skin layer can be uniform along the width of the multilayer sheet, and the unevenness of the interface between the layers can be prevented.

As stated above, according to the present invention, even if there is a great difference of the resin flow rate among the layers when forming die apparatus 10 forms the multilayer sheet 28, the thickness of each layer, and in particular, the thickness of the skin layer can be uniform along the width of the multilayer sheet 28.

Accordingly, the thickness of the layers along the width of the multilayer sheet or film can be uniform, so that a high-quality multilayer sheet or multilayer film can be manufactured stably. Moreover, the slitting width of the edges, which are located at both ends of the multilayer sheet or film along the width, decreases, so that the yield can be increased. Furthermore, even if the extruding conditions are changed due to the change in manufacturing lots, the same forming die apparatus can be used, so that the productivity can improve, and the space required for the apparatus can be made smaller. In addition, the multilayer sheet or film composed of very thin layers can be manufactured.

An explanation will hereunder be given about an embodiment in which the forming die apparatus, which is described in the above embodiment, forms the multilayer sheet composed of three layers.

In this embodiment, in order to obtain the ratio of the melt viscosity between the resins forming the skin layer and the core layer, the resins are selected among the material resins having different melt viscosity. The melt viscosity of the selected resins are shown in the following Table 1.

TABLE 1

| Resin | Melt viscosity [poise] |
| --- | --- |
| LDPE1 | 1200 |
| LDPE2 | 600 |
| LDPE3 | 2000 |

In this case, the melt viscosity of the resins are measured by a capillary rheometer (L/D=10) at a shear rate of 1000 $sec^{-1}$ and resin temperature of 300° C. The middle layer is colored by pigment so that the thickness of the layer can be easily recognized.

The kinds of resins forming three layers composing the multilayer sheet and the extruding conditions such as the resin flow rate have been tested in four test groups of this embodiment, a comparative example (1), a comparative example (2) and a comparative example (3) as shown in Table 2.

TABLE 2

|  | This embodiment | Comparative example (1) | Comparative example (2) | Comparative example (3) |
| --- | --- | --- | --- | --- |
| The number of layers | 3 | 3 | 3 | 3 |
| Die width [mm] | 1000 | 1000 | 1000 | 1000 |
| Line speed [m/min] | 150 | 150 | 150 | 150 |
| Kind of top layer resin | LDPE1 | LDPE2 | LDPE3 | LDPE2 |
| Top layer flow rate [kg/hr] | 15 | 15 | 15 | 50 |
| Kind of middle layer resin | LDPE2 | LDPE2 | LDPE2 | LDPE2 |
| Middle layer flow rate [kg/hr] | 200 | 200 | 200 | 200 |
| Kind of bottom layer resin | LDPE2 | LDPE2 | LDPE2 | LDPE2 |
| Bottom layer flow rate [kg/hr] | 200 | 200 | 200 | 200 |

In this embodiment, the conditions are set according to the method of the present invention. Low density polyethylene (LDPE1) whose melt viscosity is 1200 poise is used as the top layer resin, which forms a top layer 28A (see FIG. 2) or a skin layer, in multilayer sheet 28 composed of three layers, and the resin flow rate is set at 15 kg/hr. Low density polyethylene (LDPE2) whose melt viscosity is 600 poise is used as the middle layer resin, which forms a middle layer 28B or a core layer, and the bottom layer resin, which forms a bottom layer 28C or a core layer, and the resin flow rate is set at 200 kg/hr in each layer. That is, the ratio of the resin flow rate in the skin layer to the total resin flow rate in the core layers is set at 1:27. The melt viscosity of the resin forming the skin layer is set to be twice as high as the melt viscosity of the resin forming the core layer adjacent to the skin layer just before the confluence 18.

In the comparative example (1), low density polyethylene (LDPE2) whose melt viscosity is 600 poise is used as the resin forming the top, middle and bottom layers. The resin flow rate is set at 15 kg/hr in the top layer, and 200 kg/hr in the middle and bottom layers. That is, the ratio of the resin flow rate in the skin layer to the total resin flow rate in the core layers is set at 1:27. The melt viscosity of the resin forming the skin layer is equal to that of the resin forming the core layer adjacent to the skin layer just before the confluence 18, and the ratio of the melt viscosity is set to be lower than 1.5, which is the lower limit in the present invention.

In the comparative example (2), low density polyethylene (LDPE3) whose melt viscosity is 2000 poise is used as the top layer resin forming the top layer, and the resin flow rate is set at 15 kg/hr. The low density polyethylene (LDPE2) whose melt viscosity is 600 poise is used as the middle layer resin and the bottom layer resin forming the middle and bottom layers, and the resin flow rate is set at 200 kg/hr in each layer. That is, the ratio of the resin flow rate in the skin layer to the total resin flow rate in the core layer is set at 1:27. The melt viscosity of the resin forming the skin layer is 3.3 times as high as that of the resin forming the core layer adjacent to the skin layer just before the confluence 18, and the ratio of the melt viscosity is set to be higher than the upper limit 3 in the present invention.

In the comparative example (3), the low density polyethylene (LDPE2), of which melt viscosity is 600 poise, is used as the resin which forms the top, middle and bottom layers, and the resin flow rate is set at 50 kg/hr in the top layer, and 200 kg/hr in the middle and bottom layers. That is, the ratio of the resin flow rate in the skin layer to the total resin flow rate in the core layers is set at 1:8, which exceeds the upper limit 1/25 in the present invention. The melt viscosity of the resin forming the skin layer is set to be equal to that of the resin forming the core layer adjacent to the skin layer just before the confluence 18, and the ratio of the melt viscosity is set to be lower than the lower limit 1.5 in the present invention.

The other conditions of the die width and the line speed are 1000 mm and 150 m/min, respectively, as is the case in this embodiment, the comparative example (1), the comparative example (2) and the comparative example (3).

The extrusion test using the forming die apparatus 10 is carried out as described below. The melted resins of three layers are extruded to form the multilayer sheet 28 under the extruding conditions as shown in this embodiment, the comparative examples (1), (2) and (3). Next, the opening of the slit 30 is adjusted by the adjusting bolt 32 so that the thickness of the whole multilayer sheet 28 can be uniform along the width of the multilayer sheet 28. Then, the multilayer sheet 28 is formed again under the extruding conditions as shown in this embodiment, the comparative examples (1), (2) and (3). The thickness of the layers 28A, 28B and 28C, which compose the multilayer sheet 28, along the width of them is measured while the section of each multilayer sheet 28 formed in this embodiment, the comparative examples (1), (2) and (3) is observed with a microscope. Thereby, the difference and unevenness of the thickness are evaluated.

Table 3 shows the evaluation results under the above-mentioned conditions.

TABLE 3

|  | This embodiment | Comparative example (1) | Comparative example (2) | Comparative example (3) |
|---|---|---|---|---|
| Thickness of the top layer [µm] | 3 ± 1 | 3 ± 3 | 3 ± 2 | 10 ± 1 |
| Thickness of the middle layer [µm] | 40 ± 1 | 3 ± 1 | 40 ± 1 | 40 ± 1 |
| Thickness of the bottom layer [µm] | 40 ± 1 | 3 ± 1 | 40 ± 1 | 40 ± 1 |

Figure 2:
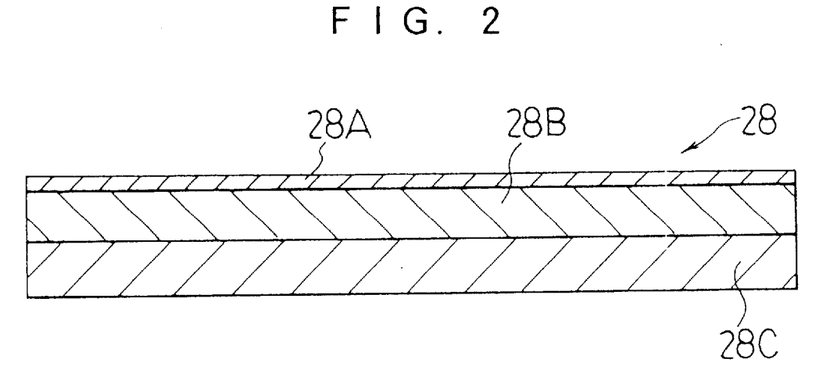
FIG. 2 is a sectional view showing a multilayer sheet in an embodiment.

As shown in the evaluation results in Table 3, in this embodiment, the thickness difference is ±1 µm in each layer composing the multilayer sheet 28. The uniform thickness along the width of the multilayer sheet 28 can be obtained in each of the layers 28A, 28B and 28C as shown in a sectional view of FIG. 2 showing the sheet, whose edges are slitted down, enlarged in the direction of thickness according to a micrograph. Moreover, as shown in the sectional view, the interface between the layers is even.

Figure 3:
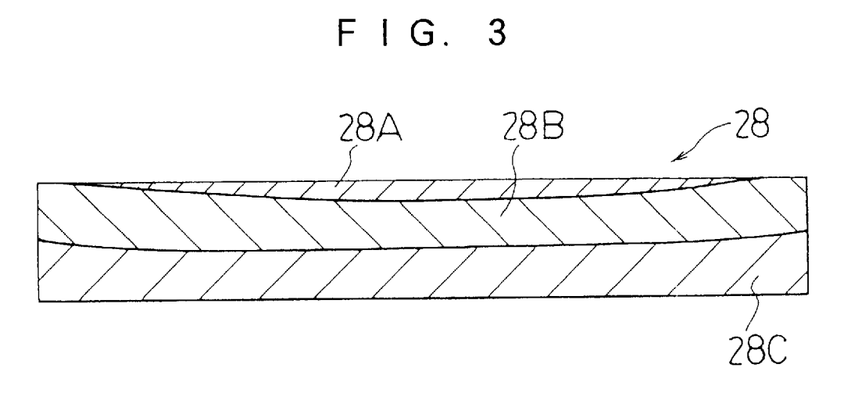
FIG. 3 is a sectional view showing a multilayer sheet in a comparative example (1)

On the other hand, in the comparative example (1) wherein the ratio of the resin flow rate is 1/27 as is the case in this embodiment, but the ratio of the melt viscosity is 1 and less than the lower limit 1.5 in the present invention, the thickness difference of the core layers is equal to that of this embodiment; however, the thickness difference of the top layer or the skin layer is ±3 µm. Moreover, as shown in the sectional view of FIG. 3, each layer is formed in such a manner as to be slightly curved down, and the central portion of the top layer is thick and both edge portions thereof are thin. The melted resin does not extend up to both edges of the skin layer.

Figure 4:
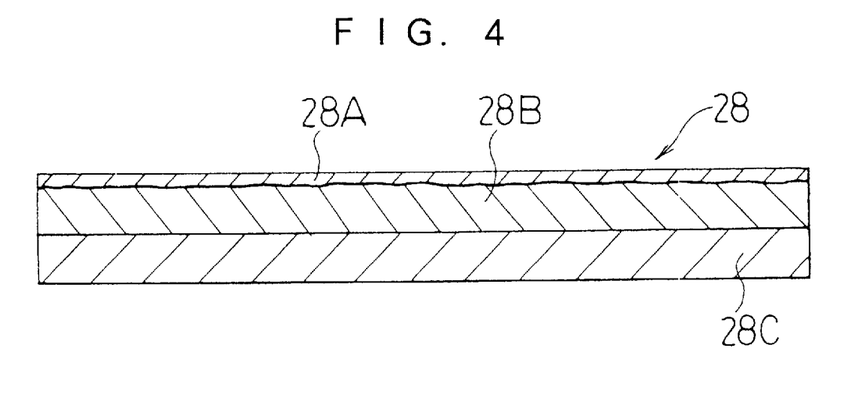
FIG. 4 is a sectional view showing a multilayer sheet in a comparative example (2)

In the comparative example (2) wherein the ratio of the resin flow rate is 1/27 as is the case in this embodiment, but the ratio of the melt viscosity is 3.3 and more than the upper limit 3 in the present invention, the thickness difference of the skin layer is ±2 µm and small compared to the comparative example (1). However, as shown in the sectional view of FIG. 4, there is an unevenness of the interface between the skin layer and the core layer.

In the comparative example (3) wherein the ratio of the melt viscosity is 1 and less than the lower limit 1.5 in the present invention, but the ratio of the resin flow rate is 1/8 and higher than the upper limit 1/25 in the present invention, there is no thickness difference in each layer, and the interface between the layers is even, though not shown in the figure. However, if the ratio of the melt viscosity is increased when the ratio of the resin flow rate is more than 1/25, there is a problem in that the unevenness occurs easily. Thus, when the ratio of the resin flow rate is less than 1/25, the ratio of the melt viscosity must be equal to or more than 1.5 and equal to or less than 3.

As shown in the above-described evaluation results, if the resin flow rate in the skin layer is equal to or less than 1/25 of the total resin flow rate in the core layers, the ratio of the melt viscosity of the resin forming the skin layer to the melt viscosity of the resin forming the core layer adjacent to the skin layer is adjusted to be equal to or more than 1.5 and equal to or less than 3 just before the confluence. As a result, the thickness of each layer can be uniform along its width, and the multilayer sheet whose interface between the layers is even can be formed.

Next, an explanation will be given about the forming die apparatus for forming the multilayer sheet or the multilayer film.

Incidentally, parts similar to the forming die apparatus, to which the previously described method of forming the multilayer sheet or the multilayer film is applied, are denoted by the same reference numerals.

An explanation will hereunder be given about the preferred embodiments of the forming die apparatus for forming the multilayer sheet or the multilayer film according to the present invention with reference to the attached drawings.

Figure 5:
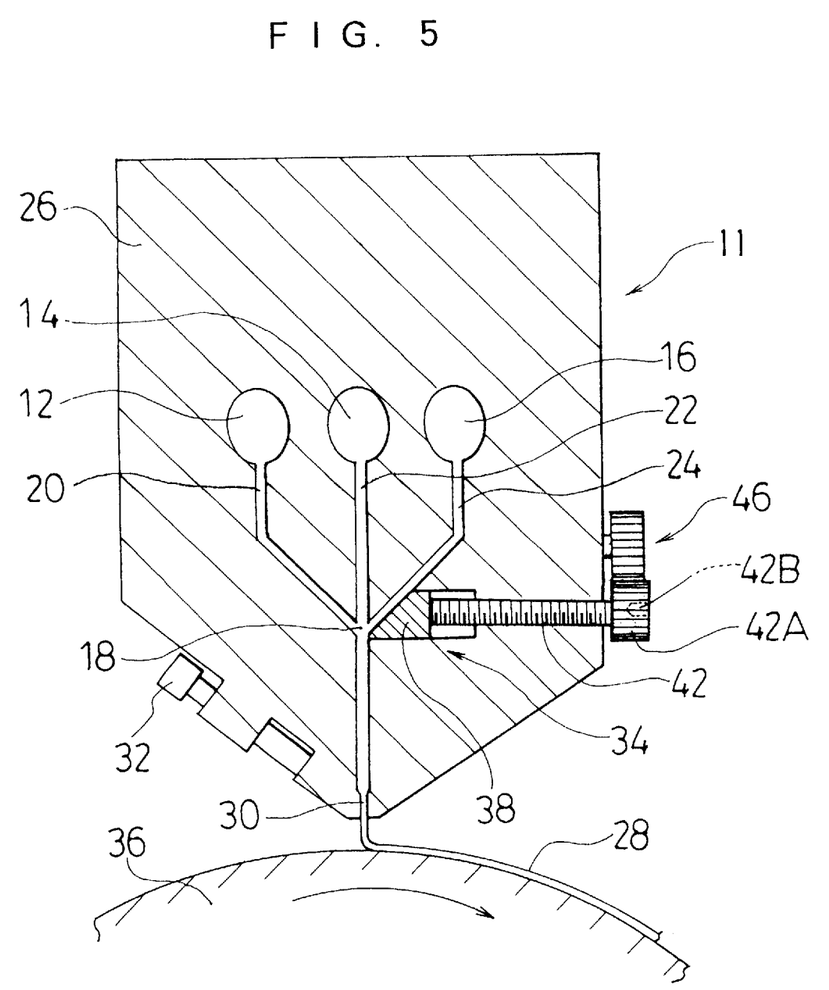
FIG. 5 is a side sectional view showing a forming die apparatus for forming a multilayer sheet or film according to the present invention.
Figure 6:
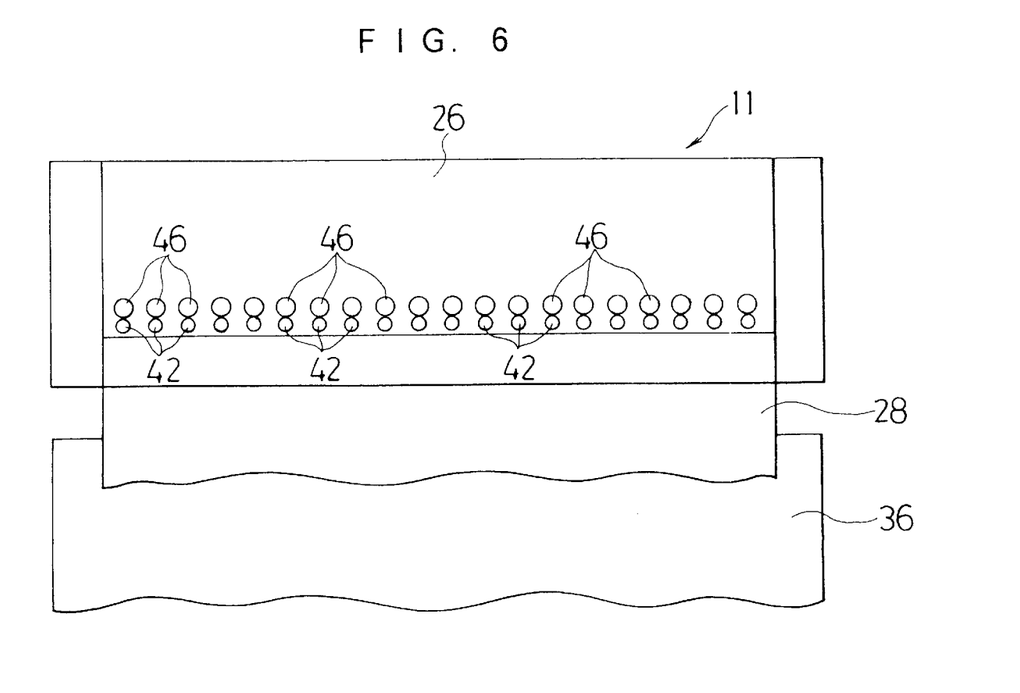
FIG. 6 is a front view showing a forming die apparatus for forming a multilayer sheet or film according to the present invention.
Figure 7:
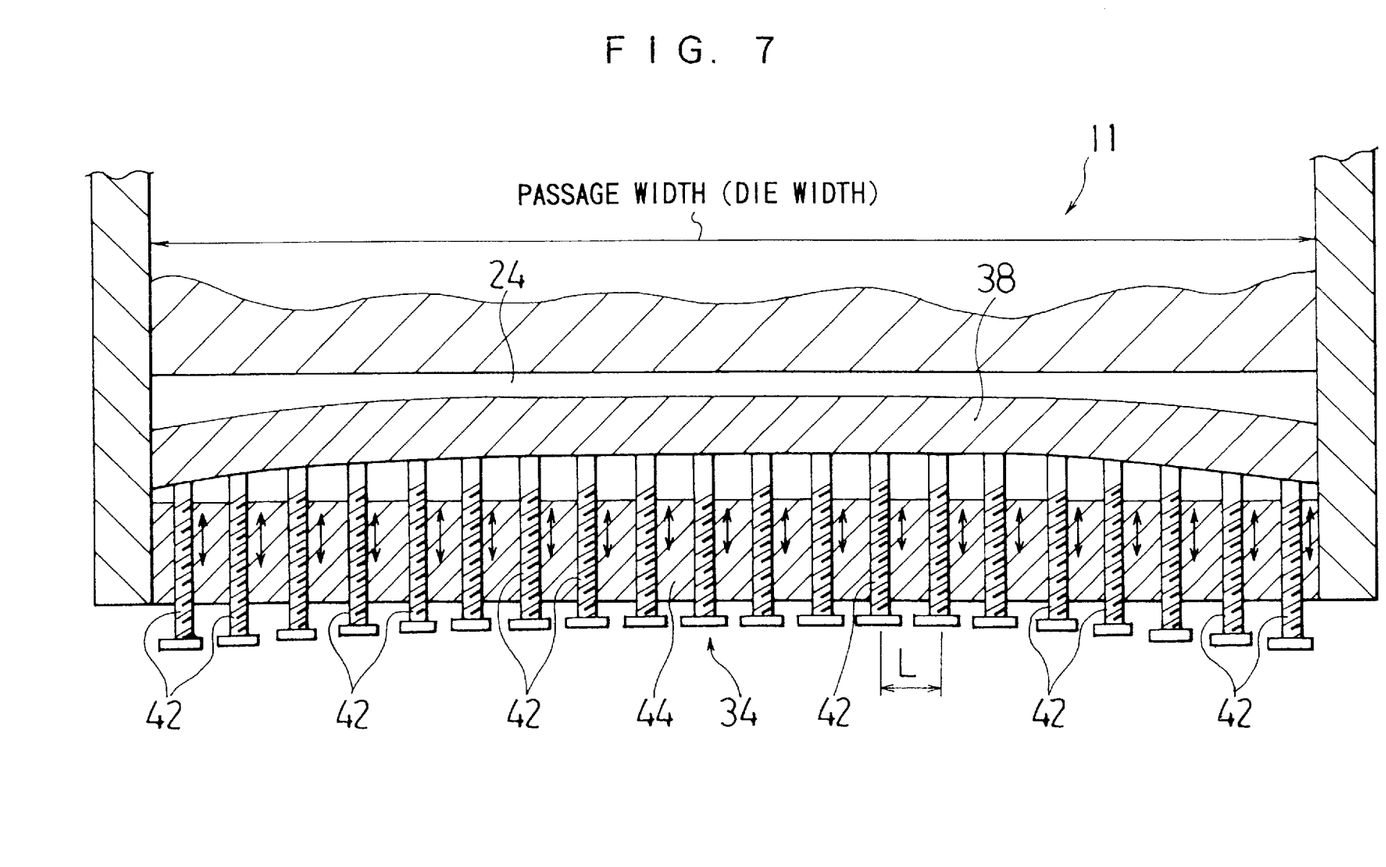
FIG. 7 is a top sectional view showing a forming die apparatus for forming a multilayer sheet or film according to the present invention.

FIG. 5 is a side sectional view illustrating the forming die apparatus 11 according to the present invention, FIG. 6 is a front view thereof (it is reduced compared to FIG. 5), and FIG. 7 is a top sectional view. Incidentally, the explanation is given about an example of forming the multilayer sheet.

As shown in FIG. 5, the forming die apparatus 11 consists of the forming die apparatus body 26 provided with the manifolds 12, 14 and 16, the confluence 18, the passages 20, 22 and 24, and the adjusting bolt 32 as previously described with reference to FIG. 1. In addition, the forming die apparatus 11 is provided with a passage clearance adjusting means 34 in at least one of the passages 20, 22 and 24. When the forming die apparatus 11 forms the multilayer sheet 28, the melted resins supplied to the manifolds 12, 14 and 16 are joined at the confluence 18 via the passages 20, 22 and 24. Then, the melted resins are piled in plural layers at the confluence 18 and are extruded from the slit 30 onto the rotating cooling drum 36. In the forming process, the streams of the melted resins are extended in the manifolds 12, 14 and 16 along the width of the passages 20, 22 and 24 (see FIG. 7), so that the thin-film streams can be formed.

As shown in FIGS. 5, 6 and 7, the passage clearance adjusting means 34 is composed mainly of a choke bar 38, which is provided from one lateral end of the passage 24 (one end of the die width) to the other end of the passage 24 (the other end of the die width) along the width of the passage 24, and a plurality of bolt members 42, 42, . . . , which are arranged at certain intervals in a row opposite to the passage of the choke bar 38 and in the longitudinal direction of the choke bar 38.

Figure 8:
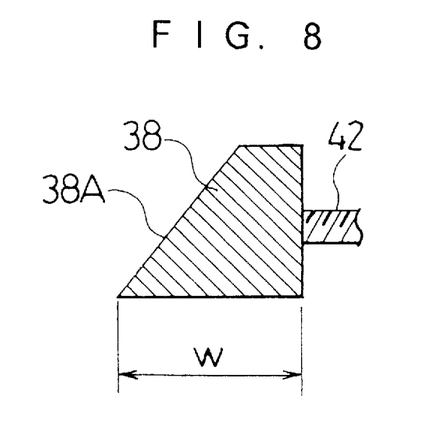
FIG. 8 is a sectional view showing a choke bar.

The tip of each bolt member 42 rotatably abuts against the choke bar 38, and each bolt member 42 is supported in a state of being engaged with a supporting member 44 of the forming die apparatus 11. Thus, if the bolt member 42 rotates in the forward and backward directions, the bolt member 42 moves in its own axial direction, and the bent part of the choke bar 38, which abuts against the rotated bolt member 42, moves forward and backward with regard to the passage 24. The above operation is performed for each bolt member 42, so that the clearance can be varied just before the confluence 18 of the passage 24. The vertical section of the choke bar 38 is substantially trapezoid as shown in FIG. 8, and the sectional width (W) is between 20 mm and 100 mm, and more preferably between 30 mm and 50 mm. That is because the strength is low if the sectional width is too small, and the range of the elastic bending becomes smaller and the quantity of the adjustment is restricted if the sectional width is too large. The interval (L) between the bolt members 42 (see FIG. 7) is between 20 mm and 100 mm, and more preferably between 25 mm and 60 mm. That is because the number of the bolt members 42 is too large and it takes much time to adjust the clearance of the passage 24 if the interval between the bolt members 42 is too small, and the clearance of the passage 24 cannot be adjusted precisely if the interval between the bolt members 42 is too large. Because a passage forming surface 38A of the choke bar 38 must be an accurately flat surface, SUS 304, which does not become rusty, is preferably used as the material for the choke bar 38.

Figure 9:
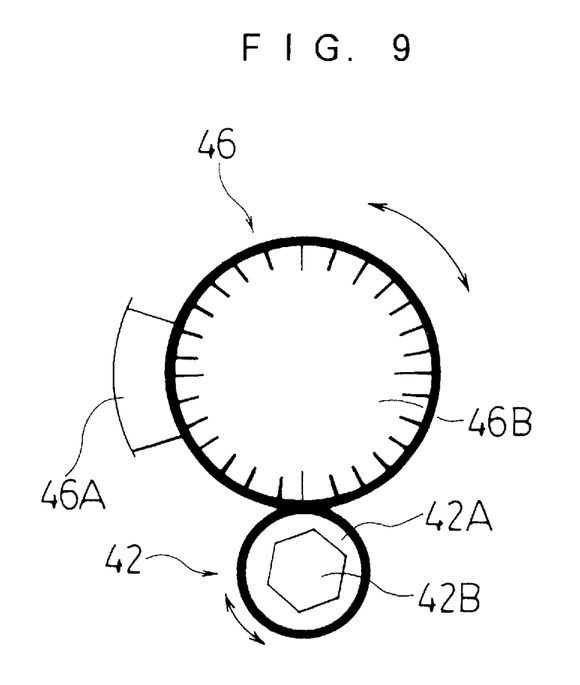
FIG. 9 is a view showing a clearance gauge.

As shown in FIGS. 5 and 9, a gear-like bolt head 42A is provided at the end of the bolt member 42 and at the outside of the forming die apparatus 11. A hexagonal hole 42B, which is engaged with a hexagonal rod (not shown) for rotating the bolt member 42, is formed at the bolt head 42A. The bolt head 42A is engaged with a gear section of a clearance gauge 46, which is rotatably supported by the outer surface of the forming die apparatus 11. The clearance gauge 46 consists of a vernier 46A and a graduated circular plate 46B. The relationship between the indication of the clearance gauge 46 and the clearance of the passage 24 is determined previously, and the clearance of the passage 24 can be found by the indication. For example, the indication 0 means that there is no clearance in the passage 24, and the indication 100 means that the clearance is 1 mm wide. If the bolt member 42 is rotated by the hexagonal rod, the choke bar 38 is bent in such a direction that the clearance in the passage 24 becomes larger or smaller, so that the clearance in the passage 24 can be adjusted. At the same time, the adjustment amount is indicated by the change of indication of the clearance gauge 46, and the clearance in the passage 24 after the adjustment can also be found.

Incidentally, in FIG. 5, the explanation was given about an example in which the passage clearance adjusting means 34 is provided only in the passage 24. However, it is more preferable that the passage clearance adjusting means 34 is also provided in the other two passages 20 and 22.

Next, an explanation will be given about the operation of the forming die apparatus 11 for forming the multilayer sheet, which apparatus is constructed in the above-mentioned manner, in an example in which the passage clearance adjusting means 34 is provided in the passages 20, 22 and 24.

Figure 12:
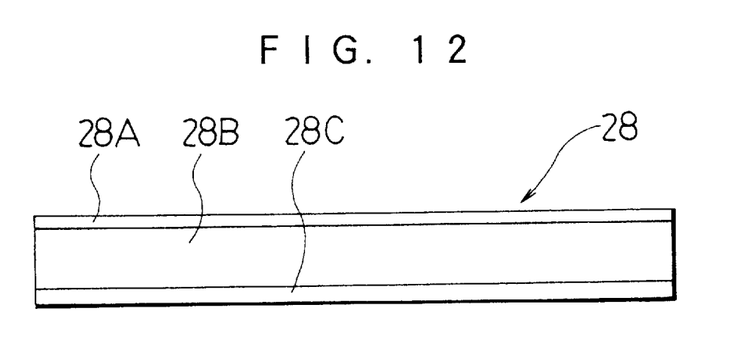
FIG. 12 is a sectional view showing a multilayer sheet in a test 1.

First, the passage clearance adjusting means 34 in the passages 20, 22 and 24 is adjusted so that there is no difference in the clearance along the width of the passages 20, 22 and 24, that is, the clearance is constant. In this state, the melted resins supplied to the manifolds 12, 14 and 16 are joined at the confluence 18 via the passages 20, 22 and 24, and the melted resins are piled in plural layers at the confluence 18 and are extruded from the slit 30 onto the cooling drum 36. Then, the thickness of the layers 28A, 28B and 28C (see FIG. 12) in the extruded and formed multilayer sheet 28 is measured in the direction of the width of the multilayer sheet 28 (the same direction as the direction of the width of the passage and the direction of the die width). If there is any part which is too thick along the width of the layers 28A, 28B and 28C, the bolt member 42 corresponding to the part is rotated and changes the form of the choke bar 38 abutting against the bolt member 42, so that the clearance at the part can become smaller. If there is any part which is too thin, the bolt member 42 corresponding to the part is rotated and changes the form of the choke bar 38 abutting against the bolt member 42, so that the clearance at the part can become larger. Thereby, the clearance in the passage is adjusted. As a result, the thickness of the layers 28A, 28B and 28C of the multilayer sheet 28 can be uniform along the width of the multilayer sheet 28. In this case, the data relating to the relationship between the clearance in the passages 20, 22 and 24 and the indication of the clearance gauges 46 is obtained according to the extrusion conditions (e.g. resin flow rate, resin temperature, and resin character) of the forming die apparatus 11. As a result, only if the bolt members 42 are rotated so that the indications of the clearance gauges 46 agree with the aforementioned data, the thickness of the layers 28A, 28B and 28C along the width of the multilayer sheet 28 can be uniform.

An explanation will hereunder be given about an embodiment in which the multilayer sheet is formed by means of the forming die apparatus which is explained in the above-mentioned embodiment.

The forming die apparatus 11 in the embodiment forms the multilayer sheet composed of three layers. The interval (L) between the bolt members 42 is 50 mm, and the sectional width (W) of the choke bar 38 is 40 mm. The passage clearance adjusting means 34 is provided in the passage 24.

Table 4 shows the extrusion conditions which have been tested.

TABLE 4

|  | Extrusion conditions A | Extrusion conditions B |
| --- | --- | --- |
| Resin temperature [°C.] | 300 | 300 |
| Die width [mm] | 1000 | 1000 |
| Line speed [m/min] | 150 | 150 |
| Top layer resin, flow rate [kg/hr] | HDPE, 25 | LDPE, 50 |
| Middle layer resin, flow rate [kg/hr] | LDPE, 200 | HDPE, 50 |
| Bottom layer resin, flow rate [kg/hr] | HDPE, 75 | LDPE, 200 |

In the multilayer sheet 28 composed of three layers under the extrusion conditions A, the top layer resin forming the top layer 28A (see FIG. 12) is the high density polyethylene (HDPE) and the resin flow rate is set at 25 kg/hr; the middle layer resin forming the middle layer 28B is the low density polyethylene (LDPE) and the resin flow rate is set at 200 kg/hr; and the bottom layer resin forming the bottom layer 28C is the high density polyethylene (HDPE) and the resin flow rate is set at 75 kg/hr. On the other hand, in the multilayer sheet 28 composed of three layers under the extrusion conditions B, the top layer resin is the low density polyethylene (LDPE) and the resin flow rate is set at 50 kg/hr; the middle layer resin is the high density polyethylene (HDPE) and the resin flow rate is set at 50 kg/hr; and the top layer resin is the low density polyethylene (LDPE) and the resin flow rate is set at 200 kg/hr. Under both of the extrusion conditions A and B, the total flow rate of the resins forming the multilayer sheet 28 is 300 kg/hr, the resin temperature is 300° C., the die width is 1000 mm, and the line speed is 150 m/min.

Figure 10:
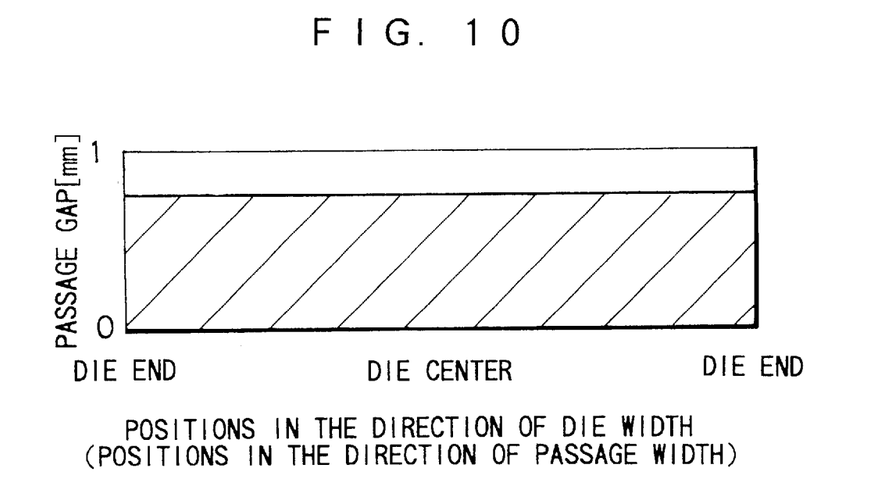
FIG. 10 is a view showing the state that there is no difference in the clearance in the passage.
Figure 11:
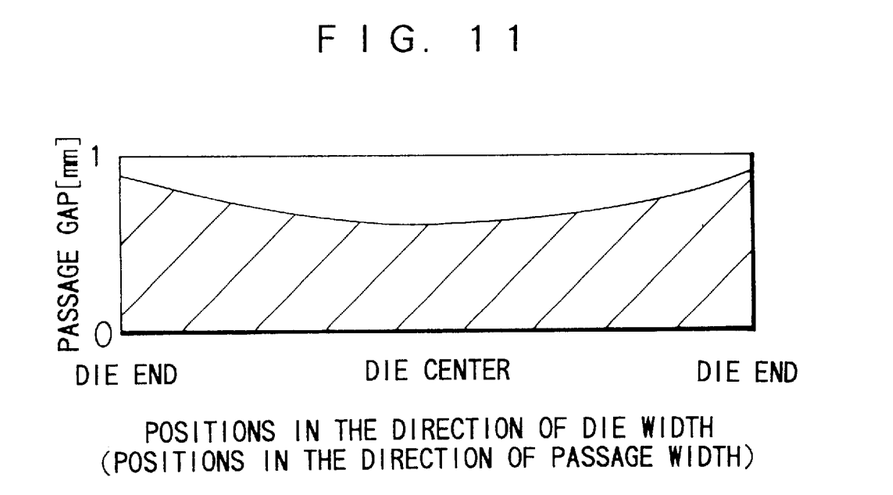
FIG. 11 is a view showing the state that there is a difference in the clearance in the passage.

As for the clearance in the passage 24 of the forming die apparatus 11, the tests have been conducted about a passage clearance property (a) in which the clearance is constant along the width of the passage as shown in FIG. 10, and a passage clearance property (b) in which the clearance along the width of the passage 24 is varied by moving the choke bar 38 forward and backward with regard to the passage 24 such that the clearance can be wide or narrow at both lateral ends of the passage 24. In FIGS. 10 and 11, the shaded portions indicate the clearance in the passage 24.

The extrusion tests were conducted by means of the forming die apparatus 11 according to the present invention in the following manner. That is, under the extrusion conditions A and B, the melted resins in three layers are extruded to form the multilayer sheet 28. Next, the whole thickness of the multilayer sheet 28 is measured, and the opening of the slit 30 is adjusted by the slit adjusting bolt 32 so that the whole thickness of the multilayer sheet 28 can be uniform along the width of the multilayer sheet 28. Then, under the extrusion conditions A and B, the multilayer sheet 28 is formed. Thereafter, the thickness of the layers 28A, 28B and 28C, which compose the multilayer sheet 28, along the width of the multilayer sheet 28 is measured while the section of the multilayer sheet 28 is viewed with the microscope. The thickness unevenness in the top layer 28A, the middle layer 28B and the bottom layer 28C is evaluated.

Table 5 shows test samples and evaluation results.

TABLE 5

|  | Test 1 | Test 2 | Test 3 |
| --- | --- | --- | --- |
| Extrusion conditions | A | A | B |
| Passage clearance property | b | a | a |
| Thickness of the top layer [μm] | 5 ± 1 | 5 ± 5 | 10 ± 2 |
| Thickness of the middle layer [μm] | 40 ± 2 | 40 ± 5 | 10 ± 2 |
| Thickness of the bottom layer [μm] | 15 ± 2 | 15 ± 4 | 40 ± 3 |

As shown in Table 5, the test 1 is a combination of the extrusion condition A and the passage clearance property (b) in which the clearance is varied as shown in FIG. 11; the test 2 is a combination of the extrusion condition A and the passage clearance property (a) in which the clearance is constant; and the test 3 is a combination of the extrusion condition B and the passage clearance property (a) in which the clearance is constant.

Figure 13:
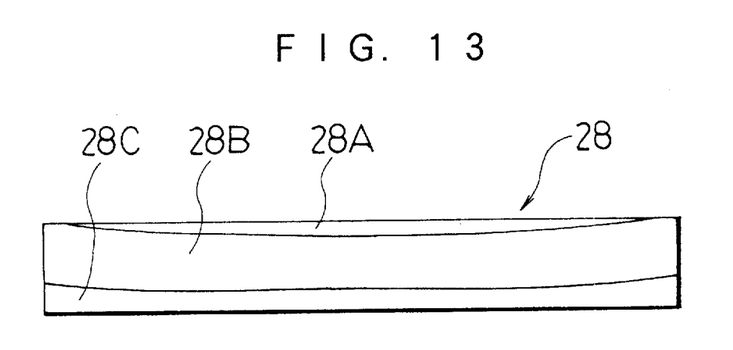
FIG. 13 is a sectional view showing a multilayer sheet in a test 2.

The test 1 is compared with the test 2 in the evaluation results shown in Table 5. In the case of the test 1 in which the choke bar 38 is provided along the width of the passage 24 and the choke bar 38 is bent by a plurality of bolt members 42 so that the clearance in the passage 24 is varied as shown in FIG. 11, the thickness differences are between 1 μm and 2 μm. As shown in a sectional view of FIG. 12 according to a micrograph, the thicknesses are uniform in the layers 28A, 28B and 28C along the width of the multilayer sheet 28. To the contrary, in the case of the test 2 in which the clearance in the passage 24 is constant, the thickness differences in the layers 28A, 28B and 28C are between 4 μm and 5 μm. As shown in a sectional view of FIG. 13 according to a micrograph, in the top thin layer 28A, the central portion is thick and both edges are thin, and the melted resin is not supplied up to both edges of the layer 28A. In the test 3, the resin flow rate in the top layer 28A is more than that in the test 2, and hence the thickness difference is small even if the clearance in the passage is constant.

As stated above, if a little resin flows and the resin has a low melt viscosity, the pressure balance is lost at the confluence 18, and the pressure at both lateral ends is normally lower than that at the center of the layer.

Thus, if the clearance in the passage just before the confluence 18 is equal along the die width, the multilayer sheet 28 cannot have a uniform thickness. That is, the flow of the melted resin tends to concentrate at the center, and thereby the central portion is thick, and both edges are thin. The wider the die, that is, the wider the multilayer sheet 28 becomes, the stronger this tendency becomes. The clearance in the passages 20, 22 and 24 must be varied along the width of the passages. For this reason, in order to obtain a multilayer sheet 28 whose thickness is uniform along the die width, the distribution of the clearance along the width of the passages 20, 22 and 24 must be precisely adjusted according to the extrusion conditions such as the melt viscosities of the resins.

According to the present invention, if there is some part which is too thick in the layers 28A, 28B and 28C in the multilayer sheet 28, which is formed by the forming die apparatus 11, the bolt member 42 corresponding to the part is rotated and pushes the choke bar 38, so that the clearance corresponding to the part can become smaller. If there is some part which is too thin, the bolt member 42 corresponding to the part is rotated and pulls the choke bar 38, so that the clearance corresponding to the part can become larger.

Thus, the clearance in the passage can be adjusted properly along the width of the passages 20, 22 and 24 according to the extrusion conditions such as the melt viscosity of the resins. Further, the clearance can be adjusted properly at the center and both lateral ends of the passages 20, 22 and 24; therefore, the difference of the clearance along the width of the passages 20, 22 and 24 can be adjusted precisely.

As described above, since the thickness of each layer can be uniform along the width of the multilayer sheet or film according to the extrusion conditions, the high-quality multilayer sheet or the multilayer film can be manufactured stably. Moreover, since the thickness of each layer can be uniform along the width of the multilayer sheet or the multilayer film, the slitting amount of the edges at both lateral ends of the multilayer sheet or the multilayer film is reduced, so that the yield can increase. Further, since one forming die apparatus can cope with the change in the extrusion conditions resulting from the change in the manufacturing lots, the productivity can increase, and the space required for the apparatus can become smaller. In addition, the multilayer sheet or the multilayer film having extremely thin layers can be manufactured.

As set forth hereinabove, according to the method of forming the multilayer sheet or the multilayer film of the present invention, the thickness of each layer in the multilayer sheet or the multilayer film can be uniform along the width of the sheet or the film.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A method for forming at least one of a multilayer sheet and a multilayer film, comprising the steps of:

supplying melted resins to plural manifolds, said melted resins being joined at a confluence via passages for said melted resins;

piling said melted resins in plural layers at said confluence; and extruding said melted resins from a slit to the outside so as to form said at least one of said multilayer sheet and said multilayer film;

wherein a flow rate of a resin forming a layer of layers composing said at least one of said multilayer sheet and said multilayer film is equal to or less than $1/25$ of a total flow rate of resins forming other layers; and a ratio of melt viscosity of said resin forming said layer to melt viscosity of a resin forming another layer adjacent to said layer is adjusted to be equal to or more than 1.5 and equal to or less than 3, such that a thickness along a width of said layer is uniform.

2. The method of forming at least one of said multilayer sheet and said multilayer film as defined in claim 1, wherein the ratio of melt viscosity is adjusted by selecting the resins forming said layers composing said at least one of said multilayer sheet and said multilayer film among material resins of different melt viscosity.

3. The method of forming at least one of said multilayer sheet and said multilayer film as defined in claim 1, wherein the ratio of melt viscosity is adjusted by adjusting temperatures of said resins forming said layers composing said at least one of said multilayer sheet and said multilayer film just before said confluence.

4. The method of forming at least one of said multilayer sheet and said multilayer film as defined in claim 1, wherein said resins forming said layers composing said at least one of said multilayer sheet and said multilayer film are polyolefin.

* * * * *